United States Patent
Fujibayashi et al.

(10) Patent No.: US 6,888,334 B2
(45) Date of Patent: May 3, 2005

(54) SYNCHRONIZATION CONTROL METHOD AND SYNCHRONIZATION CONTROL DEVICE

(75) Inventors: Kentaro Fujibayashi, Musashino (JP); Tetsuo Hishikawa, Yamanashi (JP); Takashi Idei, Fujiyoshida (JP)

(73) Assignee: Fanuc LTD, Yamanashi (JP)

( * ) Notice: Subject to any disclaimer, the term of this patent is extended or adjusted under 35 U.S.C. 154(b) by 27 days.

(21) Appl. No.: 10/272,020

(22) Filed: Oct. 17, 2002

(65) Prior Publication Data

US 2003/0090230 A1 May 15, 2003

(30) Foreign Application Priority Data

Oct. 25, 2001 (JP) ........................................ 2001-327315

(51) Int. Cl.[7] .............................................. G05B 11/32
(52) U.S. Cl. ........................ 318/625; 318/569; 318/600; 318/41; 318/85; 318/567; 318/568.1; 700/3; 700/2; 700/19; 700/61
(58) Field of Search ................................ 318/569, 600, 318/625, 41, 85, 567, 568.1; 700/3, 2, 19, 61

(56) References Cited

U.S. PATENT DOCUMENTS

| | | | | | |
|---|---|---|---|---|---|
| 4,093,904 | A | * | 6/1978 | Burig et al. ................. | 318/616 |
| 5,175,680 | A | * | 12/1992 | Yoneda et al. ................ | 700/71 |
| 5,325,307 | A | * | 6/1994 | Akashi ........................ | 700/169 |
| 5,796,221 | A | * | 8/1998 | Cramer et al. ................ | 318/68 |
| 5,917,294 | A | * | 6/1999 | Mitarai ........................ | 318/41 |
| 6,442,442 | B1 | * | 8/2002 | Weinhofer .................... | 700/86 |
| 6,625,498 | B1 | * | 9/2003 | Kurakake et al. .............. | 700/3 |

* cited by examiner

Primary Examiner—Rina Duda
(74) Attorney, Agent, or Firm—Staas & Halsey LLP

(57) ABSTRACT

A reference variable having a linear relationship with the angular position of a master axis is set, and a correspondence between this reference variable and the displacement of a slave axis is stored in a data table. One execution stage is specified by setting a starting reference variable and an ending reference variable from this data table. A desired sequence is assigned to a plurality of execution stages thus specified. The reference variable corresponding to the angular position of the master axis is determined, slave axis displacement data corresponding to the reference variable is read out, and the slave axis is positioned in accordance with the position of the master axis on the basis of this displacement data.

13 Claims, 6 Drawing Sheets

| MASTER AXIS PHASE θ | SLAVE AXIS DISPLACEMENT y |
|---|---|
| 0 | 0 |
| 1 | 5 |
| 2 | 10 |
| ⋮ | ⋮ |
| 178 | 9990 |
| 179 | 10000 |
| 180 | 9990 |
| ⋮ | ⋮ |
| 358 | 10 |
| 359 | 5 |
| 360 | 0 |

DT

| REFERENCE VARIABLE x | SLAVE AXIS DISPACEMENT y | |
|---|---|---|
| 0 | 0 | STAGE 1 |
| 1 | 10 | |
| ⋮ | ⋮ | |
| 150 | 7000 | |
| 151 | 7100 | STAGE 2 |
| ⋮ | ⋮ | |
| 560 | 20 | |
| 561 | 0 | |
| ⋮ | ⋮ | |
| 700 | 10 | |
| 701 | 30 | |
| ⋮ | ⋮ | |
| 872 | 7000 | STAGE 3 |
| 873 | 7010 | |
| ⋮ | ⋮ | |
| 1082 | 10 | |
| 1083 | 0 | |

DT

SYNCHRONIZATION CONTROL METHOD AND SYNCHRONIZATION CONTROL DEVICE

BACKGROUND OF THE INVENTION

1. Field of the Invention

The present invention relates to a synchronization control method and synchronization control device for synchronous driving of two or more movable axes, of an industrial device, construction device, or the like, in which synchronization control is performed.

2. Description of the Prior Art

In a conventional synchronization control method, one movable axis is taken as a master axis, and another movable axis is driven and controlled as a slave axis in synchronism with the master axis. In this case, the displacement of the slave axis is determined in accordance with the phase of the master axis, starting from a master axis phase of 0° until a complete revolution. Therefore, the slave axis is simply able to repeat the same operation, and it is not possible to change the operation of the slave axis during operation, in accordance with the state of the machine, or to repeat a specific operation.

FIG. 1 is an example showing the displacement y of the slave axis corresponding to respective phase θ in one revolution of the master axis which rotates one revolution through 360°. Furthermore, FIG. 2 is an illustrative diagram of a data table recording the displacement y of the slave axis corresponding to a phase θ of the master axis. As shown in FIG. 1 and FIG. 2, the displacement y of the slave axis is determined in accordance with the phase θ of the master axis, which is changing moment by moment. The master axis is usually constituted by a rotating shaft, and since the angle of rotation thereof returns to 0° when it exceeds 360°, it is capable of repeating exactly the same operation.

Moreover, if the operation of the slave axis is different for respective revolutions of the master axis, then it is necessary to input all the data for a plurality of revolutions, and hence the amount of data will increase in size. Moreover, although a sub-program method which calls up separate displacement data is commonly known, this method requires call-up processing, and therefore it has a drawback in that the pulses are interrupted at the junctions between different displacement data, and hence machining work or processing is not performed smoothly at junctions between displacement data.

Moreover, Japanese Patent No. 3220588 proposes a method wherein a plurality of cam-shape data tables are previously registered, and by combining these tables, the cam shape is modified, but the cam shape can only be modified by combinations of the registered patterns, and in order to form a desired cam shape, it is necessary to register this shape anew.

As described above, in a conventional synchronization control method, since the displacement of the slave axis is synchronized with one revolution of the master axis, from the 0° angle of the master axis, it is not possible to change the operation of the slave axis during operation of the master axis, in other words, in accordance with the state of the machinery, or to repeat particular operations. Furthermore, a problem occurs in that repeated sections must also be specified, and therefore the volume of data becomes very large.

There is also a method wherein repeated data is called up by a sub-program, or a method wherein the data is divided into a plurality of sets, but the data becomes fixed and cannot be adapted or used if the operational state is changed.

OBJECTS AND SUMMARY OF THE INVENTION

It is an object of the present invention to provide a synchronization control method and device whereby a slave axis can be moved in any pattern in synchronization with a master axis, and whereby repetition of operations can be facilitated.

The present invention relates to a synchronization control method and device for a machine having a master axis and a slave axis positioned according to the position of the master axis, wherein displacement data for the slave axis is registered in storage means; an execution stage constituted by a desired portion or the entirety of the displacement data is specified by means of a motion program or sequence program; and one or a plurality of execution stages thus specified are assigned a desired sequence, and the slave axis is positioned in accordance with the position of the master axis at all times, on the basis of the displacement data of the specified execution stages, by positioning means.

By setting a number of repeats of an execution stage, it is possible to repeat a certain execution stage a number of times. Moreover, it is also possible to specify a plurality of patterns of execution stages and numbers of repeats. Thereby, the device and method of the present invention can be applied to an application wherein an operation of a slave axis is changed at an intermediate stage in association with a switchover of an operation pattern of a slave axis which includes approaching, working/operating and retreat processes, or in association with change of an object to be processed.

Moreover, when a plurality of patterns of execution stages and numbers of repeats are specified, then if there is a differential in the displacement of the slave axis when changing patterns, the next pattern is shifted upwards or downwards in such a manner that there is no displacement differential, thereby allowing smoothly switchover to the next pattern.

Furthermore, if the execution stage of the next pattern is not continuous at switchover between patterns, then the slave axis is caused to move in a straight line to the next pattern. In particular, a synchronized relationship between the master axis and the slave axis is achieved by previously registering the displacement data for the slave axis as a function of a reference variable, and specifying a relationship between the position of the master axis and the reference variable. In one mode thereof, a synchronized relationship between the master axis and the slave axis is achieved by previously setting and registering the displacement data for the slave axis with respect to various values of a reference variable, and specifying a relationship between the position of the master axis and the value of the reference variable.

Furthermore, the relationship between the position of the master axis and the value of the reference variable is achieved by associating a reference variable range of said execution stage with a positional range of the master axis, by means of a motion program or sequence program. Moreover, the relationship between a reference variable range of an execution stage and a positional range of a master axis is achieved by achieving a relationship between a reference variable range of the execution stage and an execution start position of the master axis in accordance with an amount of change of the reference variable with respect to a unit movement of the master axis.

By adopting the foregoing composition, the present invention has the following beneficial effects.

In synchronization control for positioning a slave axis at a position corresponding to the phase of a master axis, which changes moment by moment, the device and method of the present invention can be applied to an application wherein an operation of a slave axis is changed at an intermediate stage in association with a switchover of an operation pattern of a slave axis which includes approaching, working/operating and retreat processes, or in association with change of an object to be processed, or the operation is repeated for a specified section, by specifying execution stages and number of repeats by means of a motion program or sequence program.

Moreover, since an operation can be repeated for a stage, it is possible to reduce the data volume in cases containing sections where the same operation is repeated.

As operations can be performed using the same displacement data, unlike methods using sub-programs for calling up other displacement data, call-up processing is unnecessary, so that processing wherein pulses are not lost at junctions between displacement data can be achieved readily. (Normally, it is difficult to avoid the loss of pulses at switchover between a main program and a sub-program, and hence appropriate measures must be taken.)

By enabling repetition and execution in desired stages, sections relating to the same operation can be concentrated in one place, and hence the size of the displacement data can be reduced.

BRIEF DESCRIPTION OF THE DRAWINGS

The aforementioned and other objects and features of the present invention will become apparent from the following description of the embodiments, with reference to the accompanying drawings, wherein.

DETAILED DESCRIPTION OF THE PREFERRED EMBODIMENTS

Figures 3, 4:
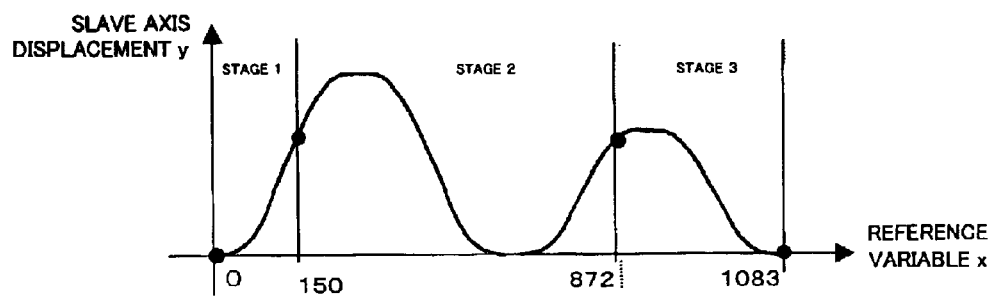
FIG. 3 illustrates the state of displacement of the slave axis according to one embodiment of the present invention.
FIG. 4 is an illustrative diagram of a data table storing the state of displacement of the slave axis corresponding to the reference variable illustrated in FIG. 3.

FIG. 3 illustrates the state of displacement of the slave axis in one embodiment of the present invention. In the present invention, a reference variable x, which associates the position of the master axis with the slave axis displacement, is provided, and the slave axis displacement y is set and registered as a function of this reference variable x. The slave axis displacement y corresponding to the reference variable x illustrated in FIG. 3 is stored in a data table DT as illustrated in FIG. 4.

Figures 1, 2:
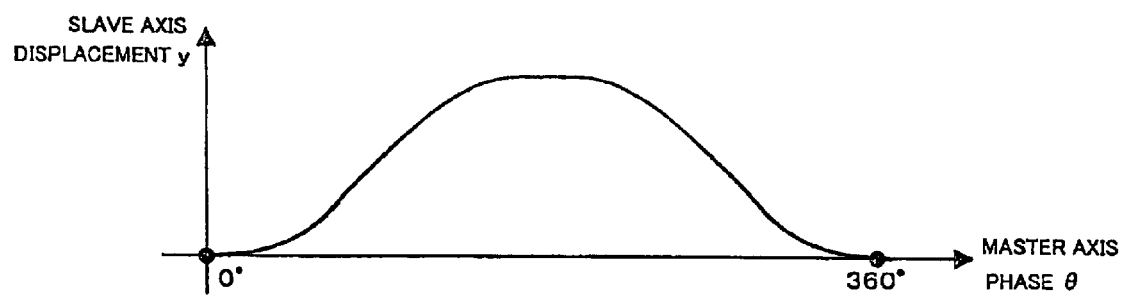
FIG. 1 is an example showing the displacement of the slave axis corresponding to respective phase in one revolution of the master axis according to conventional synchronization control.
FIG. 2 is an illustrative diagram of a data table recording the displacement of the slave axis corresponding to the phase of the master axis in the conventional synchronization control shown in FIG. 1.

Moreover, the position θ of the master axis (the position of the master axis being an angle between 0° and 360° (=0°), which is hereinafter called the phase), and the reference variable x is set in a linear relationship, whereby, for example, the reference variable x is 0 when the master axis phase θ is 0°, and the reference variable x is 50 when the master axis phase θ is 50°. In other words, there is a direct correlation between the master axis phase θ and the reference variable x. Thereby, the master axis phase θ and the slave axis displacement y corresponding to this master axis phase can be obtained by means of the reference variable x. In case where the changes in the slave axis displacement y have been recorded, as illustrated in FIG. 3 and FIG. 4, whilst the reference variable x is varied from "0" to "1083", when the slave axis is then driven in synchronism with the master axis, then the slave axis will move according to one pattern in synchronism with the master axis, similarly to the synchronization control of the prior art illustrated in FIG. 1 and FIG. 2, provided that the reference variable x changes from "0" to "1082", once, or a repeated number of times, according to the correspondence between the reference variable x and the master axis phase θ.

However, according to the present invention, the pattern of the slave axis displacement y corresponding to the reference variable x registered in this manner is divided, as illustrated in FIG. 3 and FIG. 4, in such a manner that it is possible to execute (1) synchronization control for each individual stage; (2) synchronization control for a combination of stages; or (3) synchronization control by repetition for any specified stage(s).

For example, if machine processing, operating, or the like, is performed by a master axis and a slave axis in mutual synchronization, then (1) an initial approach stage; (2) an intermediate processing/operating stage; and (3) a final retreat stage, are established. The approach stage is set as stage 1 when the reference variable x is between 0 and 150; the machining/operating stage is set as stage 2 when the reference variable x is between 150 and 872; and the retreat stage is set as stage 3 when the reference variable x is between 872 and 1083. Furthermore, stage 1 (approach stage) and stage 3 (retreat stage) are each executed once, whilst the stage 2 (machining and operating stage) is executed a plurality of times (for example, 10 times).

A total of 361 points (0, 1, 2, 360) are used for the displacement data of the slave axis during one revolution of the master axis. In other words, the displacement data of the slave axis uses one point for each change of 10 in the master axis.

This is executed by means of synchronization control motion program commands or sequence program commands, as described below. This program is called "motion program 1".

| G05 | P23010 | Q0 | R150 | S0 | T1 | L1 |
| G05 | P23010 | Q150 | R872 | S150 | T2 | L10 |
| G05 | P23010 | Q872 | R1083 | S150 | T1 | L1 |

In this program command, "G05 P23010" indicates a synchronization control command, "Q" is the reference variable at the start of the synchronization control execution stage, "R" is the reference variable at the end of the synchronization control execution stage, "S" is the position at the start of the synchronization control (phase of the master axis), "T" is a pitch of the displacement data, and "L" indicates the number of repetitions.

In this way, the execution stage is designated by specifying the reference variable at the start and the reference variable at the end by means of the addresses Q and R, respectively, and the start position (stage switch position) is specified with respect to the master axis, by means of the phase of the master axis. Moreover, the address S indicates the position of the master axis (master axis phase) at which synchronization is started. Moreover, since there is an association between the number of displacement data points of the slave axis used per complete revolution of the master axis (in this case 361 points), and the number of slave axis displacement data points in the data table DT illustrated in FIG. 4, then the pitch of the slave axis displacement data is indicated by T. For example, if Tm (pitch m; m=1, 2, . . . ) is specified, then the reference variable x will change by "m" each time the phase of the master axis changes by 1°, and hence the slave axis displacement data y and the master axis phase θ will change accordingly, each time x changes by "m".

By executing this motion program, when the master axis rotates at any speed in the plus direction from the phase 0°, the slave axis operates in the following manner.

*Approach Step (Stage 1)

This stage (x=0 to 150) is regarded as the displacement data for the slave axis corresponding to a master axis phase between 0° to 150°, and one cycle of the synchronization control in this stage is executed. Here, since "S0" is programmed, the start of the approach step occurs when the phase of the master axis is "0°". Moreover, since "Q0" is programmed, the reference variable x when the approach step starts is "0". In other words, when the approach step starts, slave axis displacement data y corresponding to the reference variable x=0 is instructed (in the example in FIG. 4, y=0). Moreover, since T=T1, the reference variable x changes by 1 each time the master axis phase changes by 1°, and hence the slave axis is also displaced by y accordingly.

Since "R150" and "L1" are programmed, and the end of the approach step occurs when the reference variable x is "150", and moreover, only one cycle of the processing of the approach step in stage 1 is performed.

Consequently, whilst the phase of the master axis changes from 0° to 150°, the reference variable x changes from 0 to 150, and accordingly the displacement y of the slave axis read out and instructed to the slave axis (each time the value of x increases by 1) changes from 0 to 7000, as illustrated by the data table DT in FIG. 4.

*Machining and Operating Step (Stage 2)

In this stage, "Q150" and "R872" are programmed, which means that in this stage the reference variable x goes from 150 to 872. Moreover, "T2" is programmed, which means that the pitch is 2, so that the reference variable x will change by "2" each time the master axis is displaced by 1°, and the slave axis displacement data y corresponding to this reference variable x which changes by 2 units at a time is instructed respectively by the data table DT. Therefore, when the master axis phase changes by one degree; 150°, 151°, 152°, . . . , the reference variable x is instructed to increased two units at a time; 150, 152, 154, . . . . The slave axis displacement y corresponding to this reference variable x is instructed respectively.

Therefore, for one revolution of the master axis from 150°–360° to 150°, the reference variable x changes from 150 to 872 (=150+360×2+2), and respective slave axis displacement data y corresponding to this x value is output. In this stage, one cycle of synchronization control is executed for one revolution of the master axis. Since y 7000 when x=150, and y=7000 when x=872, then in one cycle of this stage, the slave axis displacement y changes from 7000 to 7000. Since "L10" is programmed, the synchronization control described above is performed 10 times.

*Retreat Step (Stage 3)

In this step, since S150, Q872, T1 and L1 are programmed at the master axis phase of θ=150°, slave axis displacement data y corresponding to a reference variable x of 872 is read out, the reference variable x being increased by 1 each time the master axis phase θ increases by 1°, and the slave axis displacement data y being read out accordingly. This synchronization control is performed for one cycle only.

Here, in order to simplify the description, it is assumed that the master axis rotates in the plus direction from the phase 0°, although the start position may be anywhere within 360°. The slave axis is stationary until the phase of the master axis reaches the start position. In the example described above, step of operation comprising an approach process, work and operation process and retreat process are performed on the presumption of rotation in the plus direction, but synchronization control can also be performed if the master axis rotates in the minus direction. In this case, it is necessary to prepare a displacement data table DT which supposes rotation in the −direction.

As described above, since it is possible to set a stage in accordance with the reference variable x corresponding to the master axis phase θ, then if a data table DT such as that illustrated in FIG. 4 is provided, a desired stage can be set using this data table DT, and a slave axis can be made to move by a displacement established in the data table DT, in synchronization with the master axis.

Figure 5:
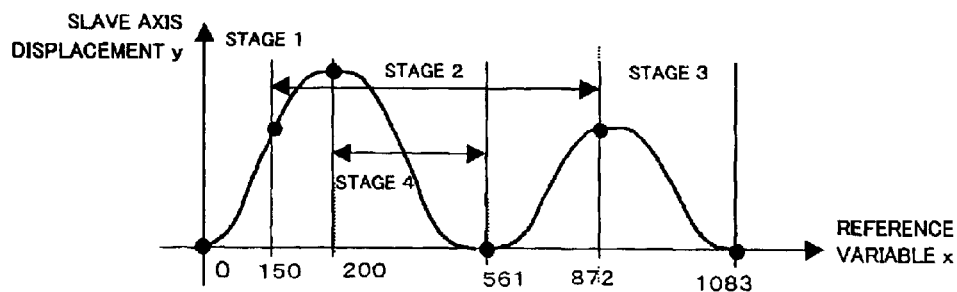
FIG. 5 is an illustrative diagram of a case where one portion of stage 2 in FIG. 3 is taken as stage 4 and is executed as a machining step 2.
Figure 6:
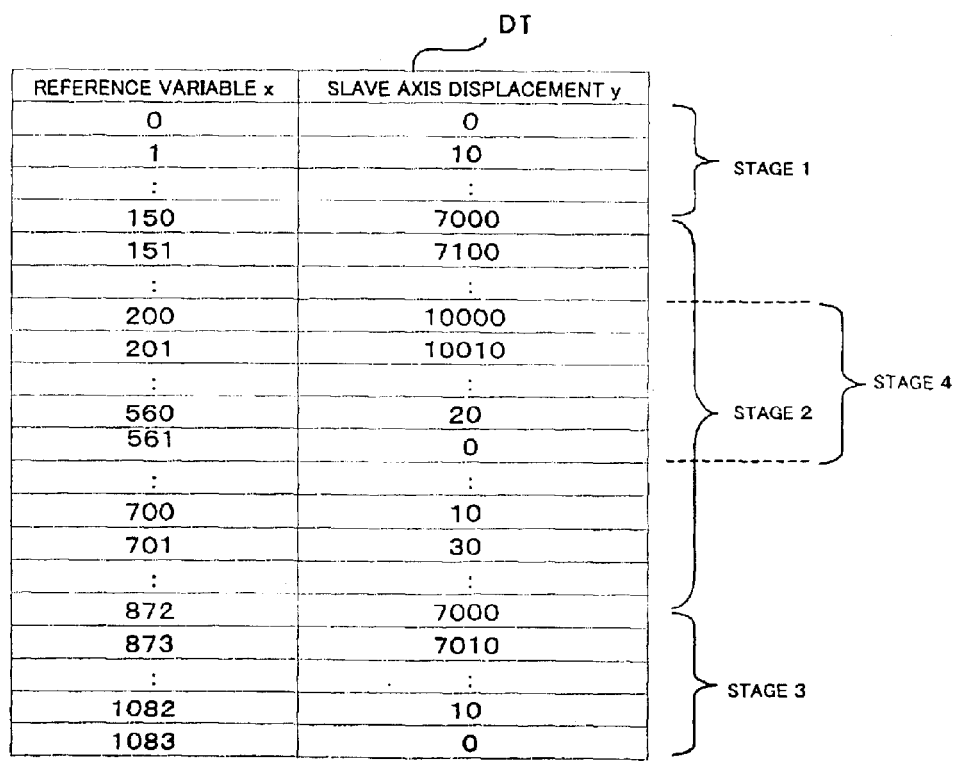
FIG. 6 is a diagram showing stages 1 to 4 in the data table illustrated in FIG. 4.

FIG. 5 is an illustrative diagram of a case where a portion of stage 2 in FIG. 3 is set as a stage 4, and this stage is taken as a machining step 2. FIG. 6 shows the respective stages 1 to 4 in the data table DT shown in FIG. 4. Here, firstly, (1) the approach processing in stage 1 is executed once at pitch 1, whereupon (2) machine processing 1 in stage 2 is performed 10 times at pitch 2, and (3) machine processing 2 in stage 4 is performed 5 times at pitch 1, and finally, (4) the retreat step in stage 3 is performed once at pitch 1.

The motion program commands and sequence program commands used in this synchronization control are as follows. This program is called "Motion program 2".

| G05 | P23010 | Q0 | R150 | S0 | T1 | L1 |
|---|---|---|---|---|---|---|

Execute stage 1 once

| G05 | P23010 | Q150 | R872 | S150 | T2 | L10 |
|---|---|---|---|---|---|---|

Repeat stage 2 ten times

| G05 | P23010 | Q200 | R561 | S150 | T1 | L5 |
|---|---|---|---|---|---|---|

Repeat stage 4 five times

| G05 | P23010 | Q872 | R1083 | S200 | T1 | L1 |
|---|---|---|---|---|---|---|

Execute stage 3 once

In case where the master axis rotates at a desired speed in the plus direction from a master axis phase of 0° by execution of this motion program, the slave axis performs the following operations.

*Approach Step (Stage 1)

One cycle of synchronization control is performed, taking the slave axis displacement data y set for a reference variable x of 0 to 150 in this stage as the slave axis displacement data corresponding to a master axis phase of 0° to 150°.

Machining Step 1 (Stage 2)

Ten cycles of synchronization control are performed, taking the slave axis displacement data y set for a reference variable x of 150 to 872 in this stage as the slave axis displacement data corresponding to a master axis phase of 150°–360°–150°. However, since the pitch is 2 (T2), the reference variable x changes by "2" each time the master axis phase changes by 10, and the slave axis displacement data y corresponding to the reference variable x changing in units of 2 is instructed respectively according to the data table DT.

Machining Step 2 (Stage 4)

Five cycles of synchronization control are performed, taking the slave axis displacement data y set for a reference variable x of 200 to 561 in this stage as the slave axis displacement data corresponding to a master axis phase of 150°–360°–150°. Since the pitch in this case is 1, the reference variable x changes by 1 each time the phase of the master axis changes by 1°.

Here, the slave axis displacement y is not the same at the end point of stage 2 (y=7000 corresponding to x=872) and the start point of stage 4 (y=10000 corresponding to x=200), but rather, there is a differential therebetween. In this case, all of the displacement data y for stage 4 is shifted in a negative direction, in such a manner that the displacement data (y=7000) at the start point of stage 4 is equal to the displacement data (y=7000) at the end point of stage 2.

Moreover, since the slave axis displacement y is not the same at the end point of stage 4 (y=0 corresponding to x=561) and the start point thereof (y=10000 corresponding to x =200), and therefore in order to repeat stage 4, when the end point (y=0) is reached, the slave axis displacement y of stage 4 is shifted in the negative direction to match the end point and the start point (y=10000). Consequently, the displacement of the slave axis falls in the negative direction after each machining process.

Retreat Step (Stage 3)

One cycle of synchronization control is performed, taking the slave axis displacement data y set for a reference variable x of 872 to 1083 in this stage as the slave axis displacement data corresponding to a master axis phase of 200°–360°– 50°. Here, since the end point of stage 4 is 150° and the start point of stage 3 is 200°, when stage 4 is completed, there will be no displacement data between 150° and 200°, until the subsequent stage 3 is reached. In this case, either the slave axis rests and waits until the master axis phase θ reaches the start point of stage 3, or alternatively, in the stage until the master axis phase θ reaches the start point of stage 3, the slave axis is moved along a straight line which links the end point of stage 4 (slave axis displacement at 150°) to the start point of stage 3 (slave axis displacement at 200°).

Figure 7:
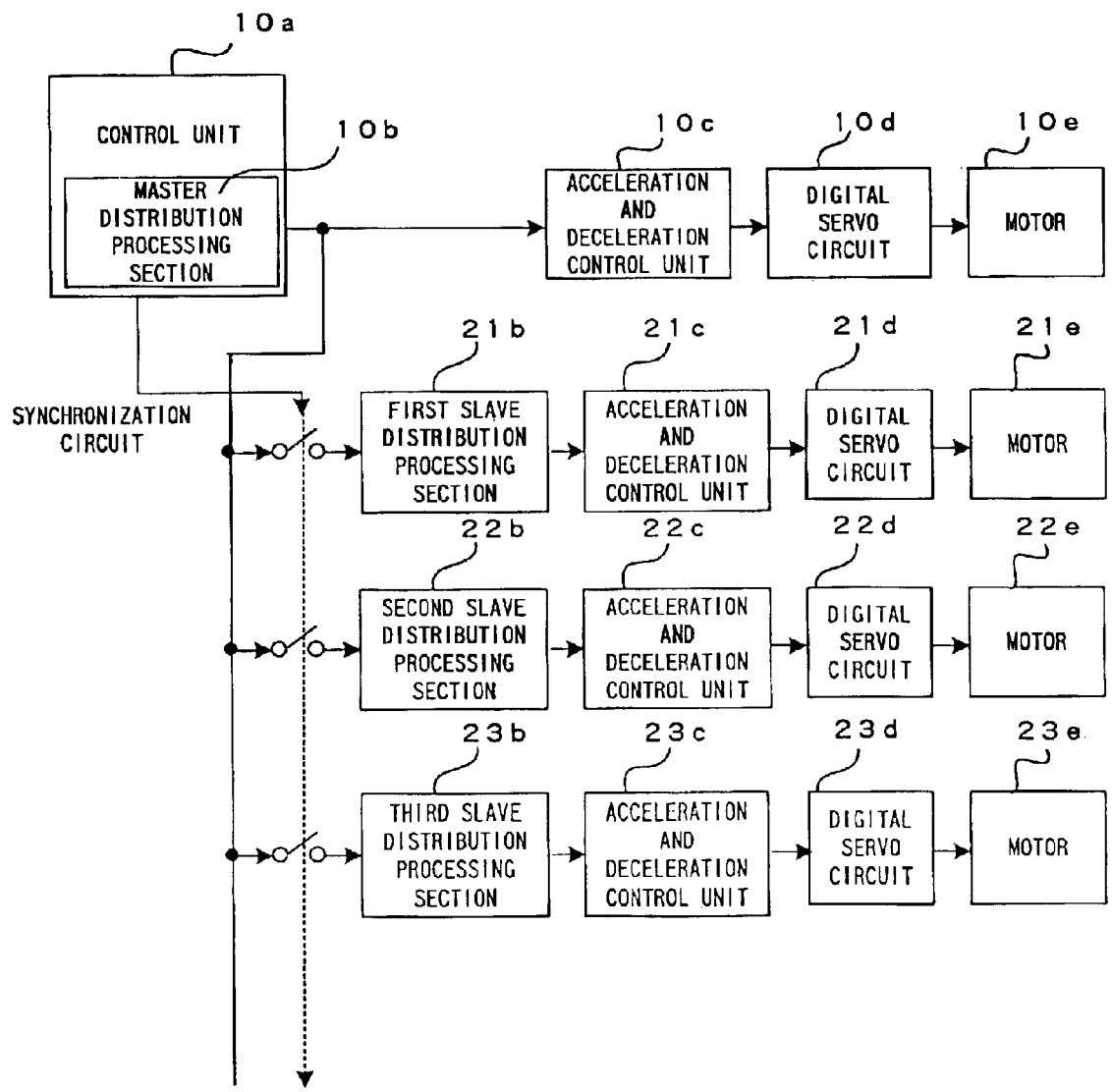
FIG. 7 is one embodiment of a control device executing the synchronization control method according to the present invention.

FIG. 7 is a block diagram illustrating an example of one composition of a control device for controlling a plurality of slave axes. The first slave axis, second slave axis, and third slave axis may be taken as mutually independent axes, or as the same slave axes.

For each slave axis, it can be selected by means of a synchronization signal whether or not to apply synchronization control to that axis. In FIG. 7, the master axis side is provided with a master axis distribution processing unit 10b, an acceleration and deceleration control section 10c, a digital servo circuit 10d, and a servo motor 10e. The acceleration and deceleration control section 10c receives signals output from the master axis distribution processing unit 10b, which a control unit 10a has, and drives the servo motor 10e thereby driving the master axis.

On the other hand, the slave axis side is provided with first, second and third slave distribution processing sections 21b, 22b, 23b, acceleration and deceleration control sections 21c, 22c, 23c, digital servo circuits 21d, 22d, 23d, and servo motors 21e, 22e, 23e. The first, second and third slave distribution processing sections 21b, 22b, 23b receive signals output by the master axis distribution processing unit 10b and create signals corresponding to each master axis and send same to the acceleration and deceleration control sections 21c, 22c, 23c.

The switching of the synchronization control of the first, second and third slave axes may be performed by switching means provided between the master axis distribution processing unit 10b and the first, second and third slave distribution processing sections 21b, 22b, 23b, said switching being executed by turning the synchronization signals on and off. Furthermore, in the example in FIG. 7, the plurality of slave axes is depicted as being three slave axes, but the invention is not limited to this example and any number of slave axes may be used.

Figure 8:
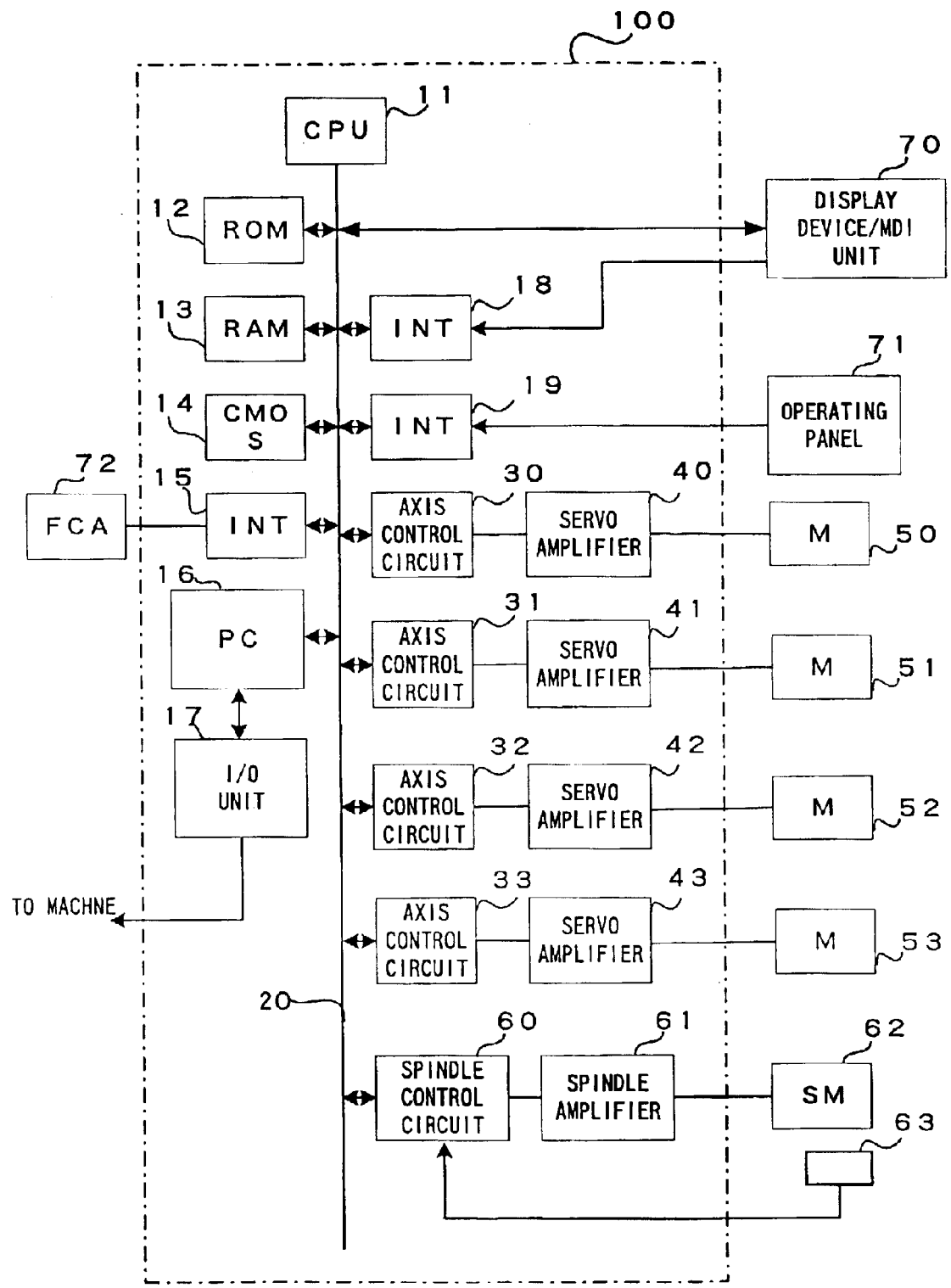
FIG. 8 is a principal block diagram of a numerical control device executing one embodiment of a synchronization control method according to the present invention.

Moreover, the synchronization control method of the present invention can be applied to a numerical control device. FIG. 8 is a block diagram of a numerical control device 100 to which the synchronization control method and device of the present invention are applied. The CPU 11 is a processor for controlling the entire numerical control device 100. The CPU 11 reads out the system program stored in the ROM 12, via the bus 20, and controls the entire numerical control device in accordance with this system program. Temporary calculation data, display data, and various types of data input by an operator via an display device/MDI unit 70 are stored in a RAM 13. A CMOS memory 14 with a battery back-up (not illustrated) forms a non-volatile memory which retains stored information, even when the power supply to the numerical control device 100 is switched off. Machining programs read in via an interface 15, and machining programs input via the display device/MDI unit 70, and the like, are stored in the CMOS memory 14. Moreover, system programs of various types for executing edit mode processing required to create or edit processing programs, or for executing processing for automatic operation, are written previously to the ROM 12.

A data table DT for performing synchronization control according to the present invention is previously written to the non-volatile memory 14. A data table DT of this kind is established for each slave axis, but if two or more slave axes will perform the same operation, then it is only necessary to provide one data table DT for same.

The interface 15 allows connection between the numerical control device 100 and an external device 72 such as an adapter. Processing programs are read in from the external device 72. Moreover, processing programs edited in the numerical control device 100 can be stored in external storage means, via the external device 72. A programmable controller 16 performs control by outputting signals to an auxiliary device of a machine tool device (for example, the actuator of a robot hand for exchanging tools), via an I/O unit 17, according to a sequence program installed in the numerical control device 100. Furthermore, it also receives signals from various switches, and the like, on an operating panel provided on the main body of the machine tool, and after carrying out the necessary signal processing, it passes these signals to the CPU 11. It is also possible to use signals from the machine as synchronization signals for the present invention.

The display device/MDI unit 70 is a manual data input device provided with a display and keyboard, or the like, and an interface 18 receives commands and data from the keyboard of the display device/MDI unit 70 and transfers same to the CPU 11. An interface 19 is connected to an operating panel 71 provided with a manual pulse generator, and the like.

Axis control circuits 30 to 33 of the respective axes receive a movement command for each axis from the CPU 11, and output the commands for the respective axes to servo amplifiers 40 to 43. The servo amplifiers 40 to 43 receive these commands and drive the servo motors 50 to 53 of the respective axes. The servo motors 50 to 53 of the respective axes have built-in position and velocity detectors, and position and velocity feedback control is performed by feeding back the position and velocity feedback signal from the position and velocity detectors to the axis control circuits 30 to 33. In FIG. 8, the portion relating to position and velocity feedback is omitted.

Moreover, the spindle control circuit 60 receives a main axis rotation command, and output a spindle velocity signal to a spindle amplifier 61. The spindle amplifier 61 receives this spindle velocity signal and causes the spindle motor 62 to rotate at the instructed speed of rotation. A position coder 63 feeds back a feed-back pulse to the spindle control circuit 60 in synchronism with the rotation of the spindle motor 62, thereby performing velocity control.

Although it is assumed that the master axis is taken as the spindle axis (spindle control circuit 60, spindle amplifier 61, and spindle motor 62), it is also possible for the master axis to be constituted by one of the other axes (the axes driven by the axis control circuits 30 to 33, servo amplifiers 40 to 43, and servo motors 50 to 53), settings being used to determine which axis is the master axis and which axes are the slave axes.

Figure 9:
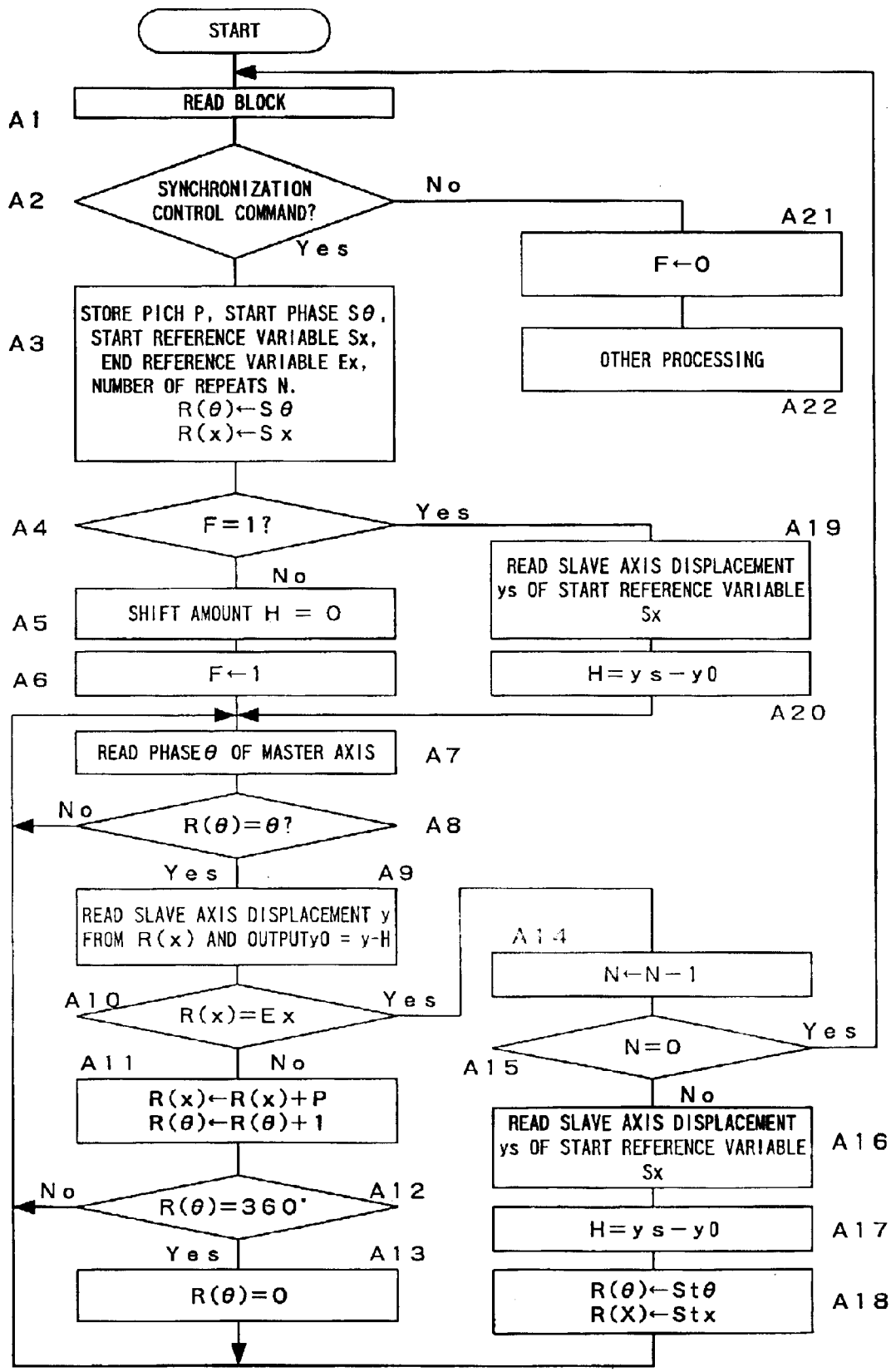
FIG. 9 is a flow chart of one embodiment of a synchronization control method according to the present invention.

FIG. 9 is a flowchart of synchronization control executed by the numerical control device described above. In this example, it is supposed that synchronization control is performed by taking the spindle axis as the master axis, and the remaining one or plurality of axes as slave axes. In this case, if there are two or more slave axes, and synchronization control is performed with each slave axis performed a different action, then a data table DT such as that illustrated in FIG. 4 or FIG. 6 must be provided for each slave axis performing a different action. In the example described below, in order to simplify the explanation, it is assumed that only one slave axis is provided.

The processor 11 reads in one block of the program (step A1) and determines whether or not the command issued in that block is the synchronization control command "G05 P23010" (step A2), and if it is not the synchronization control command, then a flag F is set to "0" (step A21), and the processing instructed by this block is executed.

On the other hand, if it is the synchronization control command, then the command values of the addresses Q, R, S, T, L instructed by the block, are read out. Thereupon, the reference variable x for the start of synchronization control as instructed by address Q is set as the starting reference variable Sx. The phase θ of the master axis at the start of synchronization control as instructed by address S is taken as the starting phase Sθ. The reference variable at the end of synchronization control for the stage in question as instructed by address R is taken as the end reference variable Ex. The value indicated by address T is set as pitch P. Moreover, the value indicated by address L is taken as the number of repetitions N. These values, Sx, Sθ, Ex, P, N are then stored. The start phase Sθ is stored in the register R(θ), and the start reference variable Sx is stored in the register R(x).

An example is now described with reference to the motion program 2 illustrated by FIG. 5 and FIG. 6. In this example, in the initial block, the recorded values are Sx=0, Sθ=0, Ex=150, P=1, and N=1. And Sθ=0 is stored in register R(θ), and Sx=0 is stored in register R(x). The spindle axis forming the master axis is assumed to rotating at a prescribed velocity.

It is determined whether or not flag F is set to "1", and since initially it is set to "0" by the initial settings or the processing in step A21, the procedure advances to step A5, the shift amount H is set to "0", and the flag F is then set to "1" (step A6).

Thereupon, the phase θ of the master axis is read out (step A7), and it is determined whether the master axis phase θ has reached the start phase (Sθ) for the synchronization stage stored in register R(θ) (step A8), and steps A7 and A8 are repeated until the phase has reached the start phase. In the initial block (stage 1) of the motion program 2, Sθ=0, and therefore the system waits until the master axis phase θ reaches "0", whereupon when the master axis phase θ reached "0", the slave axis displacement y corresponding to the start reference variable Sx stored in register R(x) is read out from the data table DT in FIG. 6. The stored shift amount H (initially set to "0" at step A5) is subtracted from the slave axis displacement y thus read out, and the resulting slave axis displacement is output (step A9). In the first block (stage 1) of the motion program 2, the reference variable Sx=0, and the corresponding slave axis displacement y=0, and hence an output of y0=0−0=0 is output to the slave axis.

Thereupon, it is judged whether or not the value stored in the register R(x) has reached the end reference variable Ex for that stage (step A10), and if this variable has not been reached, then the pitch P is added to the register R(x) storing the reference variable and 1° is added to the register R(θ) storing the master axis phase (step A11). If the register R(θ) storing the master axis phase is not 360°, the register is left unchanged, and if it has reached 360°, then the register R(θ) is set to "0", whereupon the sequence returns to step A8 and the processing at step A7 and the following steps, described above, is executed. P=1 is added to the register R(x) and the phase θ stored in the register R(θ) advances by 1°, which means that when the master axis phase θ has advanced by 1°, the judgement at step A8 will return the answer "Yes". Consequently, at the following step A9, the slave axis displacement y corresponding to the reference variable x, which has advanced by 1, is read out, the shift amount H=0 is subtracted, and the slave axis displacement y0=y is output.

Thereafter, the stored value in the register R(θ) advances, 0, 1, 2, 3, . . . , in synchronization with which, the register R(x) also advances 0, 1, 2, 3, . . . , and the slave axis displacement y corresponding to reference variable x stored in the register R(x) is read out in accordance with the data table DT. The shift amount H is subtracted from the slave axis displacement y read out, and the resulting value is output as the slave axis displacement. When the register R(x) 150, and the register R(θ)=150, at step A10, it is judged that R(x)=Ex=150, in other words, when stage 1 has ended, then the sequence moves from step A10 to step A14, one is subtracted from the register storing the number of revolutions N (step A14), and it is judged whether or not the number of revolutions N stored in the register has reached "0" (step A15). In the initial block (stage 1) of motion program 2, the number of revolutions is one, and therefore, N becomes N=0, the procedure returns from step A15 to step A1, and the next block is read. Here, the next block of the motion program 2 is also a synchronization control command, which indicates ten repetitions of the pattern of stage 2 illustrated in FIG. 5. At step A3, the values stored are Sx=150, Sθ=150, Ex=872, P=2, N=10. And Sθ=150 is stored in the register R(θ), and Sx=150 is stored in the register R(x).

Moreover, since the flag F is set to "1", the sequence proceeds from step A4 to step A19, and the slave axis displacement y corresponding to the reference variable stored as the start reference variable Sx (=150) is read out. This displacement is taken as ys (=7000). The slave axis displacement y0 (=7000) at the end of the previous block (stage 1) determined at step A9 is subtracted from the start slave axis displacement ys for the stage in question (stage 2), in order to determine a differential, and this differential is taken as the shift amount H (step A20). The shift amount H when moving from stage 1 to stage 2 in FIG. 5 is H=ys−y0=7000−7000=0.

Thereupon, the processing at step A7 and the following steps is performed, but in stage 2, P=2 is set, and therefore at step A11, P=2 is added to the register R(x). Therefore, each time the master axis phase θ increases by 1°, then reference variable x advances by 2, in other words, as the master axis phase θ changes one degree at a time, from 150°, 151°, 152°, . . . to 0° . . . to 150°, the value of the register R(x) storing the reference variable x changes in units of 2, from 150, 152, 154 . . . to 510 . . . to 872, and the slave axis displacement y corresponding to this reference variable x is read out, the shift amount H=0 is subtracted from the read out slave axis displacement y, and the resulting value is output as the slave axis displacement y0.

When one processing operation of stage 2 described above has ended and the stored value in register R(x) has reached the end reference variable Ex=872, then the sequence advances from step A10 to step A14, and the register storing the number of revolutions N is decremented by "1". In this case, N becomes N=9. Since the number of revolutions N is not "0", then the sequence proceeds from step A15 to step A16, the slave axis displacement ys corresponding to the start reference variable Sx stored at step A3 is read out, and the slave displacement y0 determined at step A9 is subtracted from the slave displacement ys to determine the shift amount H (step A17). In the case of stage 2, as illustrated in FIG. 5 and FIG. 6, the slave axis displacement ys corresponding to the start reference variable Sx of stage 2 is "7000" and the slave axis displacement y0 at the end of stage 2 is also "7000", and hence the shift amount H is "0".

Thereupon, the start phase Sθ of the master axis in stage 2 as stored at step A3 is recorded in register R(θ), and the start reference variable Sx of stage 2 is stored in register R(x) (step A18), whereupon the sequence proceeds to step A7.

Thereafter, the processing from step A7 to step A18 is repeated until the value of the register storing the number of revolutions N reaches "0". In this case, the shift value H is "0".

When the processing for stage 2 between step A7 and step A18 has been performed 10 times and the number of revolutions N has become "0", then the sequence returns to step A1, and the next block is read out. The next block of motion program 2 is the processing operation in stage 4, and since the set values are Q=200, R=561, S=150, T=1 and L=5, a command is issued to start a stage in which the reference variable x changes from 200 to 561 from the time at which the master axis phase θ is 150°, at a pitch of 1, and to repeat this stage five times. This command is read in and the processing in step A3 is executed, and the values P=1, Sθ=150°, Sx=200, Ex=561, N=5, R(θ)=150° and R(x)=200, are stored. Since the flag F is "1", the sequence advances from step A4 to step A19.

In the processing in stage 1 and the processing of the 10 cycles of stage 2, the shift amount H is "0", and therefore the slave axis displacement y0 at this point is "7000" corresponding to the end reference variable x="872" of stage 2, whereas the start reference variable Sx of stage 4 is "200", and hence the corresponding slave axis displacement y is "10000" and ys=10000, and at step A20, the shift amount H is calculated to be H=ys−y0=10000−7000=3000.

Thereupon, the processing in stage 4 is repeated five times by means of the processing at step A7 and the following steps, and in the initial processing of this stage, since the shift amount H is "3000", as described above, and the master axis phase θ at the start of stage 4 is the same as the master axis phase 150 at the end of stage 2, then the phase θ=150° is read out directly at step A7, and since it coincides with the value stored in the register R(θ), the procedure advances from step A8 to step A9, and the value "10000" of the slave axis displacement y corresponding to the reference variable x=200 stored in R(x) is read out. However, the shift amount H=3000 is then subtracted from the read out displacement y, resulting in a slave axis displacement y0 being "7000", which is equal to the slave axis displacement at the end of stage 2, and hence stage 2 and stage 4 become continuous. One cycle of stage 4 is executed by executing the processing from step A7 to step A13 described above. In this case, since the shift amount H is corrected at step A9 with respect to the slave axis displacement y read out in accordance with the reference variable, in FIG. 5, the pattern of the slave axis displacement in stage 4 is shifted downwards by "3000".

When one cycle of stage 4 ends, N becomes N=4 at step A14, and the sequence proceeds to step A16, where the slave axis displacement ys="10000" corresponding to the start reference variable Sx of stage 4 is read out, and the slave axis displacement y0 at that point as determined in step A9 is subtracted from the displacement ys="10000" to derive the shift amount H (step A17). In other words, the shift amount H is determined in such a manner that the value of the slave axis displacement y at the end of one cycle of stage 4 is the same as the starting value of the slave axis displacement in the second cycle of stage 4. Thereupon, the start phase Sθ of the master axis in stage 4, and the start reference variable Sx are stored in the register R(θ) and R(x), respectively (step A18), and the processing at step A7 and the following steps is executed.

When the processing in stage 4 has been executed five times by repeating the processing from step A7 to step A18, N becomes N=0, and the sequence proceeds from step A15 to step A1 and the next block is reads out. The next block in motion program 2 involves processing for executing the processing in stage 3 once, and since Q=872, R=1083, S=200, T=1 and L=1, the values Sθ=200, Sx=872, Ex=1083, P=1, and N 1 are stored, and Sθ=200 and Sx=872 are stored in registers R(θ) and R(x), respectively. At steps A19 and A20, the shift amount H is determined by subtracting the end slave axis displacement y1 of the previous stage, stage 4, from the start slave axis displacement ys for the present stage, stage 3, and processing at step A7 and the following steps is executed, but since the master axis phase at the end of the preceding stage 4 is 150°, and the master axis phase at the start of the present stage 3 is 200°, then the processing in step A7 to step A8 is executed until the master axis phase θ reaches 200°, during which time the slave axis assumes a stationary state.

When the master axis phase θ is 200° and therefore coincides with the start phase 200° stored in the register R(θ) (step A8), then the processing at step A9 and the following steps, described above, is executed. Thereafter, the processing from step A7 to step A13 is repeated, and when the value of the register R(x) reaches the end reference variable Ex of the present stage 3, then the procedure proceeds from step A10 to step A14, the register storing the number of revolutions N is decremented by "1", and at step A15 it is confirmed that the number of revolutions has reaches "0", and hence the sequence returns to step A1 and the next block is read, but in case where the next block is not a synchronization control command, then the synchronization control ends, the flag F is set to "0" (step A21), and the processing instructed by this block is executed (step A22).

In the embodiment illustrated in FIG. 5 and FIG. 6, a stage 4 is within stage 2, and this stage 4 was executed, but if different synchronized operations relating to a master axis are to be performed by the slave axes, then the slave axes can be controlled in a synchronized manner with respect to the master axis, by setting the different synchronization pattern sections of the slave axes by means of different reference variables, and selecting these reference variables appropriately. For example, if the approach operation and retreat operation in stage 1 and stage 3 are the same, but different patterns to those of stage 2 and stage 4 are selected for the machining and working operations, then the pattern of the slave axis displacement for the region of different reference variables is stored in the data table DT, and by selecting this reference variable region, it is possible to execute machining and working operations for stages of a different pattern.

In the present embodiment, when changing over from one stage to another, a shift amount H is determined in such a manner that the slave axis displacement at the start of the present stage coincides with the slave axis displacement at the end of the preceding stage, but it is also possible to move the slave axis in a straight line from the slave axis displacement at the end of the preceding stage until the slave axis displacement at the start of the present stage. In this case, if there is a differential Δθ between the master axis phase at the end of the preceding stage and the master axis phase of the present stage, then the differential between the slave axis displacement at the end of the preceding stage and the slave axis displacement at the start of the present stage is divided by this differential Δθ to determine a shift amount for the slave axis Δy for each 1° change in the master axis changes, and each time the master axis increases by 1° after the end of the preceding stage, a value obtained by adding the increase amount Δy for the slave axis to the slave axis displacement at the end of the preceding stage is instructed to the slave axis. Moreover, if the differential Δθ between the master axis phase at the end of the preceding stage and the master axis phase at the start of the present stage is "0", but there is a differential Δy in the slave axis displacement y, then the slave axis should be moved in a straight line by differential Δy, whilst the master axis performs a 360° revolution.

Moreover, in the foregoing embodiment, a case was described wherein a master axis is rotated at a speed whereby the master axis phase θ advances 1° at a time, but the rotational speed of the master axis may be changed as desired. In this case, the slave axis is positioned to the slave axis displacement corresponding to the reference variable x which in turn corresponds to the phase of the master axis.

What is claimed is:

1. A synchronization control method for a machine having a master axis and a slave axis positioned to a position corresponding to the position of said master axis, comprising the steps of:

registering displacement data for said slave axis;

specifying a plurality of execution stages, each constituted by a desired portion or the entirety of said displacement data, by means of a motion program or sequence program;

specifying a sequence for said plurality of execution stages thus specified; and positioning the slave axis in accordance with the position of the master axis on the basis of said registered displacement data, for each respective execution stage, in accordance with said specified order.

2. The synchronization control method according to claim 1, wherein, by specifying a number of repeats of a positioning operation performed in a desired execution stage, the positioning operation of the execution stage is repeated for a plurality of cycles.

3. The synchronization control method according to claim 1, wherein a plurality of patterns of execution stages and numbers of repeats can be specified by a motion program or sequence program.

4. The synchronization control method according to claim 1, also being applicable to an application where the operation of the slave axis is changed at an intermediate stage in association with switchover of an operation pattern of the slave axis including approach process, processing/working process, and retreat process, or in association with change of an object to be processed, by specifying execution stages and numbers of repeats by means of a motion program or sequence program.

5. The synchronization control method according to claim 1, wherein, when a plurality of patterns of execution stages and numbers of repeats are specified by a motion program or sequence program, then if there is a difference in the displacement of the slave axis when changing patterns, the next pattern is shifted upwards or downwards in such a manner that there is no displacement difference, thereby allowing smoothly switchover to the next pattern.

6. The synchronization control method according to claim 1, wherein, if a plurality of patterns of execution stages and numbers of repeats is specified by a motion program of sequence program, and if the execution stage of the next pattern is not continuous at switchover between patterns, then the slave axis is moved in a straight line to the next pattern.

7. The synchronization control method according to claim 1, wherein a synchronized relationship between the master axis and the slave axis is achieved by registering said displacement data for said slave axis in advance as a function of a reference variable, and specifying a relationship between the position of the master axis and the value of the reference variable.

8. The synchronization control method according to claim 1, wherein a synchronized relationship between the master axis and the slave axis is achieved by setting and registering said displacement data for said slave axis in advance with respect to various values of a reference variable, and specifying a relationship between the position of the master axis and the value of the reference variable.

9. The synchronization control method according to claim 8, wherein the relationship between the position of the master axis and the value of the reference variable is achieved by associating a reference variable range of said execution stage with a positional range of the master axis by means of a motion program or sequence program.

10. The synchronization control method according to claim 8, wherein the relationship between the position of the master axis and the value of the reference variable is achieved by a reference variable range of said execution stage, a master axis execution start position, and an amount of change of the reference variable with respect to a unit movement of the master axis, by means of a motion program or sequence program.

11. A synchronization control device for a machine having a master axis and a slave axis positioned to a position corresponding to the position of said master axis, comprising:
   storing means for registering displacement data for said slave axis;
   specifying means for specifying a plurality of execution stages each constituted by a desired portion or the entirety of said displacement data, and specifying a desired order for the plurality of execution stages thus specified; and
   means for positioning the slave axis in accordance with the position of the master axis, which changes moment by moment, on the basis of the displacement data in said specified execution stages.

12. A synchronization control device for a machine having a master axis and a slave axis positioned to a position corresponding to the position of said master axis, comprising:
   a data table DT for setting a reference variable x having a linear relationship with the angular position θ of the master axis, and storing a correspondence between said reference variable x and the slave axis displacement y;
   execution stage specifying means for freely specifying an individual execution stage by setting a starting reference variable x and an ending reference variable x from said data table;
   means for allocating a sequence to a plurality of execution stages specified by said execution stage specifying means; and
   slave axis displacement command reading means for reading out a command for displacing the slave axis from a slave axis displacement y corresponding to said starting reference variable x to a slave axis displacement y corresponding to said ending reference variable x, in accordance with said data table DT, in the period in which the master axis rotates from an angular position θ corresponding to the starting reference variable x in one execution stage allocated with a desired sequence, to an angular position θ corresponding to the ending reference variable x thereof.

13. The synchronization control device according to claim 12, further comprising pitch specifying means capable of setting the amount P by which the reference variable x changes when the angle θ of the master angle changes by one unit to any desired pitch value.

* * * * *

UNITED STATES PATENT AND TRADEMARK OFFICE
CERTIFICATE OF CORRECTION

PATENT NO. : 6,888,334 B2
DATED : May 3, 2005
INVENTOR(S) : Kentaro Fujibayashi et al.

It is certified that error appears in the above-identified patent and that said Letters Patent is hereby corrected as shown below:

Column 4,
Line 51, change "(0, 1, 2, 360)" to -- 0, 1, 2, ..360) --;
Line 54, change "10" to -- 1° --;

Column 5,
Line 31, change "(Stage 1)" to -- (stage 1) --;
Line 55, change "(Stage 2)" to -- (stage 2) --;

Column 6,
Line 9, change "(Stage 3)" to -- (stage 3) --;

Column 7,
Line 5, change "(Stage 1)" to -- (stage 1) --;
Line 10, change "(Stage 2)" to -- (stage 2) --;
Line 17, change "10" to -- 1° --;
Line 21, change "(Stage 4)" to -- (stage 4) --;
Line 46, change "(Stage 3)" to -- (stage 3) --;

Column 10,
Line 64, change "R(x) 150" to -- R(x)=150 --;

Column 12,
Line 62, change "N1" to -- N=1 --;
Line 65, change "y1" to -- y0 --.

Signed and Sealed this

Eleventh Day of April, 2006

JON W. DUDAS
*Director of the United States Patent and Trademark Office*